Aug. 9, 1938. K. FIEDLER ET AL 2,126,378
CONTROLLER FOR GAS HEATED APPARATUS
Filed Feb. 5, 1934 2 Sheets-Sheet 2

Inventors
Kurt Fiedler
Georg Hegwein
Otto Merten
Friedrich Wilhelm Stockmeyer
by Stewart & McKay
their attorneys Patented Aug. 9, 1938

2,126,378

UNITED STATES PATENT OFFICE 2,126,378

CONTROLLER FOR GAS-HEATED APPARATUS

Kurt Fiedler, Stuttgart, and Georg Hegwein and Otto Merten, Dessau, and Friedrich Wilhelm Stockmeyer, Stuttgart, Germany, assignors to Junkers & Co. G. m. b. H., Dessau, Germany Application February 5, 1934, Serial No. 709,679½ In Germany February 8, 1933

18 Claims. (Cl. 236—25)

The present invention relates to controllers for gas-heated apparatus, such as liquid-heaters, air-heaters or the like, in which the supply of gas is dependent, on the one hand, on variations in gas pressure or flow and, on the other hand, on working conditions of the medium to be heated for instance liquid or air pressure, or temperature. The variations in gas pressure may be produced by fluctuations in pressure in the gas-supply pipe or passage; they may also be produced in an auxiliary passage by so-called controlling valves, which in their turn are controlled by sensitive adjusting devices, for example by the heat of a pilot-flame.

Controlling devices are already known in which the valves influenced by the working conditions of the medium to be heated also act on a current of control gas flowing, for instance, in a branch gas passage, the pressure variations in which operate the so-called main gas valve. In this case, when the gas pressure conditions are insufficient, sufficient adjusting forces are not always available for operating the main gas valve, whilst the adjusting devices to be operated by the working conditions of the gas apparatus may easily be arranged for the operation of even strongly loaded valves having great closing force.

Now a second valve, for example, a safety valve, influenced by alterations in gas pressure has already been arranged behind a gas valve controlled by the flow or temperature of the medium to be heated. In this case, it is found by experience that the first-named valve is frequently operated, whilst a safety valve controlled, say, by the pilot flame through a current of controlling gas only very seldom comes into operation,—namely, on the extinction of the pilot flame. The danger therefore exists that this safety valve may seize during the long periods of rest, and then fail at the very time when it should, with certainty, intervene in the controlling operation. If, on the other hand, this second valve serves as a gas pressure or gas consumption regulator, the passage of gas does not always coincide with the working requirements of the apparatus, but is controlled exclusively corresponding to the properties of the adjusting device in question, for instance a diaphragm or float disc surface or valve load, whereby the adjusted heating capacity does not always correspond to the actual working conditions.

The object of the present invention is to remove these drawbacks, to permit a far better adaptation of the gas supply to the working conditions of the apparatus and to ensure, even when employing safety valves which rarely come into action, increased security for permanent reliable working.

The invention consists in the fact that the controlling arrangement operated by the gas pressure is influenced in such a way by the device controlled by the working conditions of the gas apparatus that it must follow its closing movements, but under the influence of the gas pressure variations acting on its adjusting member, for instance a diaphragm or float disc, can perform independent control movements.

This mutual influencing of the two arrangements can be effected by mechanical coupling members positively acting in the closing direction of the accessory control device, or by a valve operated by the gas pressure being subjected to the variations in the gas pressure which are produced by the operation of a control valve in the gas pipe leading to the burner influenced by the said working conditions of the gas appliance; the gas current to the burner in this case undertakes the mutual influencing of the two regulating devices in the desired direction of adjustment and thus replaces mechanical coupling members.

Several examples of construction of the invention are shown in the accompanying drawings, in which:—

In all the controlling arrangements illustrated, an adjusting member (gas pressure control device) A controlled by differences in gas pressure, and a control device B, dependent, for instance, on the pressure or the quantity of the medium to be heated, on a working temperature or other working condition, are present, and jointly influence the supply of gas to the burner C.

Figure 1:
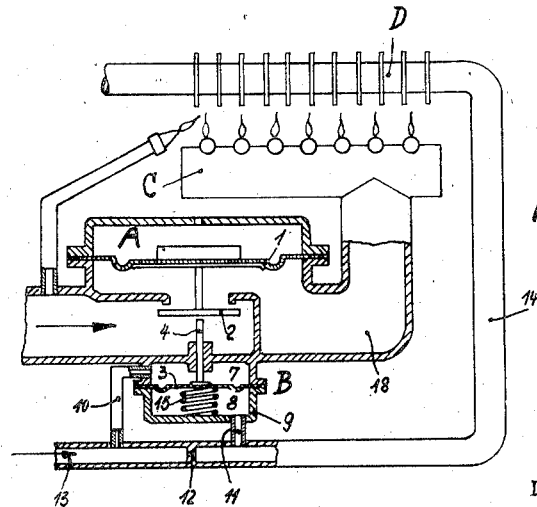
Figure 1 shows a gas-heated apparatus having a gas pressure controller the valve of which is also influenced by the flow of the medium to be heated.

In the construction shown in Figure 1, A is a gas-pressure controller, controlled by the consumption pressure and having a diaphragm 1 and valve 2. This valve is under the influence of a push-rod 4 connected with the diaphragm 3 of the control device B. The pressure chambers 7 and 8 of the casing 9 separated by the diaphragm 3 are connected by pressure relief pipes 10 and 11 to the parts 13 and 14, connected together by a contracted part 12 of the cold water pipe leading to the heater D. When no water is taken from the heater, the same pressure prevails in the two pressure chambers 7 and 8, the diaphragm 3 with the push-rod 4 is pressed by the spring 15 against the valve 2 of the gas-pressure controller A, whereby the supply of gas to the burner C is shut off. When water is drawn off, a drop in pressure occurs at the contracted part 12, which results in a decrease of the pressure in the chamber 8 relative to the pressure in the chamber 7. The diaphragm is at the same time moved against the force of the spring 15, and the rod 4 permits the valve 2 to open in proportion to the quantity of water flowing through the pipes 13 and 14. Within the clearance for movement now available, the valve 2 can move to correspond to the conditions of gas pressure in such a way that the gas supply suitable for the heater cannot be exceeded even with a great gas pressure.

Figure 2:
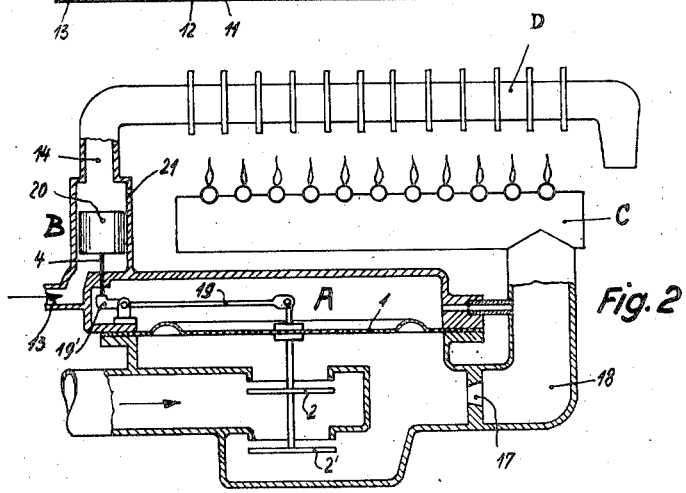
Figure 2 shows an apparatus having a gas quantity controller the load on which constantly varies with the quantity of the medium to be heated.

In the example of construction shown in Figure 2, the double seated valve 2, 2' of a gas quantity controller A whose diaphragm 1 is controlled by the drop in pressure occurring at a contracted part 17 in the pipe 18 leading to the burner C, is in communication by a two-armed lever 19, 19' with a piston 20.

The piston is mounted with play in a casing 21 which is built into the cold water pipe 13, 14. The clearance between the piston and the wall of the casing takes the place of the constriction 12 in Fig. 1. The drop in pressure occurring here tends to raise the piston in proportion to the quantity of water flowing through the pipe 13, 14. The relief in weight occurring in this case effects an increased opening of the gas supply valve 2, 2' in proportion to the quantity of the water flowing through the heater D.

Figure 3:
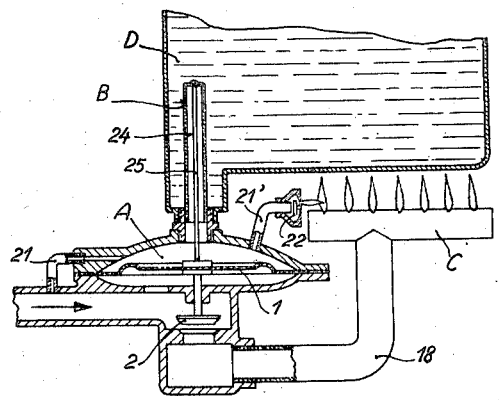
Figure 3 shows a heating appliance controlled by a thermostat, whose heat-sensitive member acts on a safety valve which is controlled by the variations in pressure occurring in an auxiliary pipe.

In the construction illustrated in Figure 3, an auxiliary gas pipe 21, 21' branches off from the main gas pipe and at its end an ignition or pilot valve 22 of known kind is provided. The variations in pressure in the auxiliary pipe caused by this valve act in known manner on the diaphragm 1 of the gas pressure control device A in such a way that the valve 2 can be opened only when the pilot flame is burning. In the appliance D which may be a boiler or supply container located in front of the burner C a thermostat 24 is arranged, the heat-sensitive member 25 of which can move the valve towards its seat when the temperature of the container requires a diminution of the gas supply. Within the clearance for movement of the valve allowed by the heat-sensitive member 25 the valve 2 can perform control movements under the influence of the variations in pressure in the auxiliary pipe 21.

Figure 4:
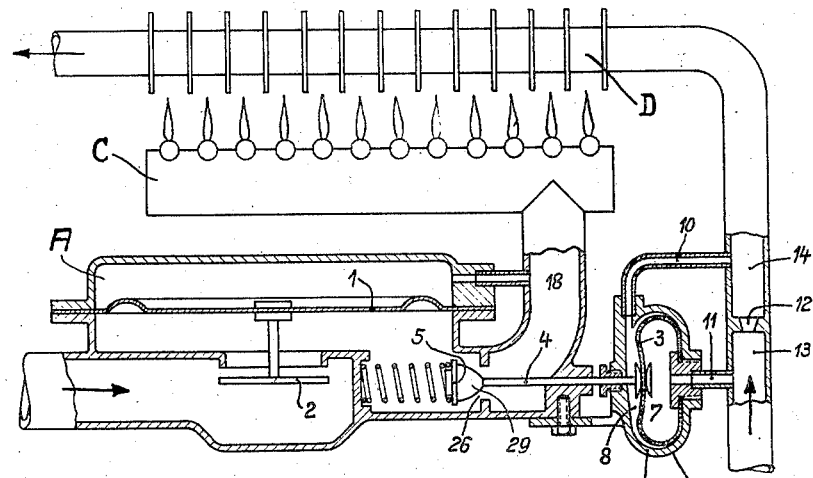
Figure 4 shows a controlling arrangement in which a control device operated by the flow of the medium to be heated controls the cross section at which the fall in pressure occurs for controlling a gas-pressure control device constructed as a gas quantity regulator.

The control arrangement shown in Figure 4 simply differs from the constructions shown in Figures 1 to 3 by the controlling device B being provided with a valve 5 which governs the controlling cross section 26 at which the differences in pressure occur that are necessary for controlling the control device A formed as a gas quantity regulator. The effect of this arrangement is that the quantity of gas flowing to the burner C is solely dependent on the quantity of the water flowing to the heater D.

Figure 5:
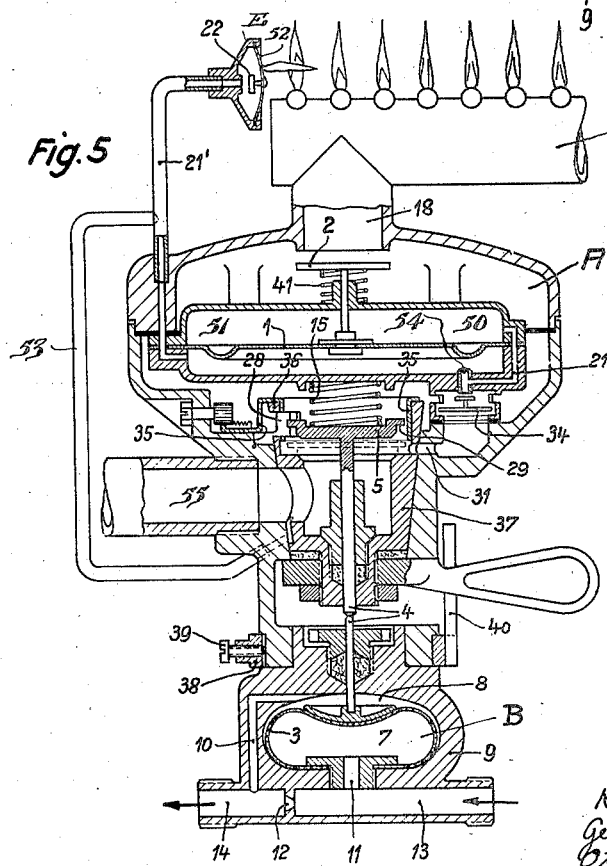
Figure 5 shows a construction in which the degree to which the gas pressure control device is influenced by the control device of the apparatus can be altered by an externally operated adjusting member.

In the controlling arrangement shown in Figure 5, the valve 5 of the operating device B influenced by the flow of the medium to be heated is provided with a valve-like controlling piston 29 moving in a passage opening 28. The valve device A is operated by pressure variations which are controlled in an auxiliary gas passage on the one hand by a pilot valve 22, and on the other hand by a floating controller 34. The part 31 of the auxiliary gas passage is connected to a point in the main gas path which in the position of repose of the valve 5 is cut off from the gas supply. The valve 2 is thus held constantly closed under the influence of the spring 41 on the closure of the valve 5 even when the control valves 22 and 34 are opened. The valve 2 therefore can not seize even if the pilot valve 22 only seldom comes into operation. This arrangement of the auxiliary gas passage also gives the advantage that even when the passage cross section is only slightly opened by the valve 5 an auxiliary gas current controlled by the valve 34 undertakes the control of the valve 2. An opening 28, serving as controlling cross section for the gas quantity to be supplied to the burner C, is arranged in a rotatable valve 35 adjustable from the outside. Said opening 28 can be more or less covered by a further rotatable valve 36 provided with an opening. This valve 36 is in communication with the gas cock 37 in such a way that the free cross section of the opening 28, and thus the controlling movement of the valve 2, is dependent on the position of this gas cock at each desired position of the valve 5 and the piston valve 29. A stop 40 secured to a ring 38 and adapted to be fastened by a set-screw 39 to the casing of the operating device B permits the degree of the mutual influencing of the two valves 5 and 2 to be limited to the extent desirable for the heater.

The operation of the device shown in Fig. 5 is as follows: When no water is flowing through the pipe 13, 14, the controlling valve 5 remains closed. As the auxiliary gas pressure is derived from the main gas flow behind the valve 5, no control-gas can flow through the passage 31 and over the floating controller 34 to the chambers 50 and 51 of the regulating device A and to the pilot burner E. The same pressure now prevails on both sides of the diaphragm 1 and therefore the force of the closing spring 41 can press the valve body 2 on to its seat. The pilot flame is extinguished and therefore the thermostatic disc 52 of the pilot burner closes the pilot pipe 21'. To prevent the extinguishing of the pilot flame, a small quantity of gas may flow continuously through a pipe 53. When the controlling valve 5 is opened by the pressure of the flowing water, gas flows through the passage 31, over the floating controller 34 and through the passage 21 into the chamber 50; one part of the control gas flows through a throttle 54 into the chamber 51. From the chamber 51 the gas can flow into the pilot line 21' and further to the pilot burner E. The pressure in the chamber 51 is therefore lower than the pressure in the chamber 50. The pressure in the chamber 50 now presses the diaphragm downward and effects the opening of the valve 2. The gas coming from the main gas-pipe 55 flows through the openings 28 in the rotatable walls 35, 36 before it passes into the burner pipe 18. The effective cross-section of the gas passage is adjusted by the more or less covering of the opening 28 by the rotatable wall 36. If the gas consumption of a burner is small, the openings 28 are suitably closed by moving the rotatable wall 36; if the gas consumption of the apparatus is large, the openings 28 are further opened. This adjustment corresponds, however, only for a given pressure of the gas main. In order, even where the pressure in the mains is variable, to enable a uniform quantity of gas to be constantly supplied to the burner B, the valve 2 must narrow the gas passage when the mains' pressure is higher and enlarge it when the mains' pressure is smaller. The floating device 34 is employed for this purpose. A changing of the pressure in the main gas line influences the floating device 34 and thus the current of control gas which flows through the throttle 54 and the passage 21. The floating device 34 is influenced by the difference of the pressures which is produced by the openings 28. On the lower side of the disc acts the unthrottled pressure in the main gas line and on the upper side the reduced pressure behind the openings 28. If the main pressure increases, the floating device 34 throttles the control gas line. Therefore the pressure in the chamber 50 is reduced; consequently the valve 2 under the influence of the spring 41 can now execute a closing movement. If the pressure difference between the main gas line and the space behind the openings 28 is reduced to a value equal to or less than the weight of the disc 34, the disc is brought into its normal position. The throttling action thus ceases and the pressure in the control chamber 50 above the diaphragm again increases, so that the control valve 2 is correspondingly further opened. The varying pressure in the mains is thus regulated by the floating device 34 automatically for the passage of a constant quantity.

We declare that what we claim is:

1. A controller for gas-heated apparatus, including a casing having a gas passage therein, a differential pressure operated gas valve in said passage subject to variations in gas pressure and adapted to govern one condition in the gas flow, and an auxiliary valve in said gas passage subject to the influence of at least one factor in the working of the apparatus and adapted to cause gas pressure variations on opposite sides of said valve in accordance with variations in said factor and thus to cause variations in the adjustment of said gas valve on variation of said factor.

2. A controller for gas-heated apparatus, including a casing having a gas passage therein, a differential pressure operated regulator in said gas passage adapted to govern one condition in the gas flow, an adjustable throttle member in the gas passage adapted to produce differential gas pressures on opposite sides of said regulator and an adjusting member subject to the influence of at least one factor in the working of the apparatus adapted to adjust said throttle member.

3. A controller for gas-heated apparatus, including a casing having a gas passage therein, a differential pressure operated regulator in said gas passage adapted to govern one condition in the gas flow, an adjustable throttle member in the gas passage adapted to produce differential gas pressures for application to opposite sides of said regulator, an adjusting member subject to the influence of at least one factor in the working of the apparatus adapted to adjust said throttle member, and a valve control member subject to the influence of at least one factor in the working of the apparatus adapted to serve as shut-off valve and also as a control for the adjustment of said throttle member.

4. A controller for gas-heated apparatus, including a casing having a gas passage therein, a differential pressure operated regulator in said gas passage adapted to govern one condition in the gas flow, an adjustable throttle member in the gas passage adapted to produce differential gas pressures for application to said regulator, an adjusting member subject to the influence of at least one factor in the working of the apparatus adapted to adjust said throttle member, and manually operable means for adjusting said throttle member.

5. A controller for gas-heated apparatus, including a casing having a gas passage therein, a differential pressure operated regulator in said gas passage adapted to govern one condition in the gas flow, an adjustable throttle member in the gas passage adapted to produce differential gas pressures for application to said regulator and an adjusting member subject to the influence of at least one factor in the working of the apparatus adapted to adjust said throttle member, and manually operable means for adjusting the degree of influence of said adjusting member on said throttle member.

6. A controller for gas-heated apparatus, including a casing having a gas passage therein, a differential pressure operated regulator in said gas passage adapted to govern one condition in the gas flow, an adjustable throttle member in the gas passage adapted to produce differential gas pressures for application to opposite sides of said regulator, an adjusting member subject to the influence of at least one factor in the working of the apparatus adapted to adjust said throttle member and a gas cock adapted to govern the supply of gas to said casing.

7. A controller for gas-heated apparatus, including a casing having a gas passage therein, a differential pressure operated regulator in said gas passage adapted to govern one condition in the gas flow, an adjustable throttle member in the gas passage adapted to produce differential gas pressures for application to said regulator, an adjusting member subject to the influence of at least one factor in the working of the apparatus adapted to adjust said throttle member, a manually operable member adapted to adjust the degree of influence of said adjusting member on said throttle member and a gas cock associated with said manually operable member adapted to govern the supply of gas to said casing, the association between said manually operable member and said gas-cock being such that the differential pressures produced by said throttle member are dependent upon the position of the gas-cock.

8. A controller for gas-heated apparatus, including a casing having a gas passage therein, a differential pressure operated regulator in said gas passage adapted to govern one condition in the gas flow, an adjustable throttle member in the gas passage adapted to produce differential gas pressures for application to said regulator, an adjusting member subject to the influence of at least one factor in the working of the apparatus adapted to adjust said throttle member, manually operable means for adjusting the degree of influence of said adjusting member on said throttle member, and an adjustable stop for limiting the movement of said manually operable member.

9. A controller for gas-heated apparatus including a casing having a main gas passage and an auxiliary gas passage branching from said main gas passage, a gas valve governing the pressure of the gas flowing through said main gas passage and operable to normally maintain gas flow at a predetermined pressure through said main gas passage, said gas valve being subjected to variations in the gas pressure existing in said auxiliary gas passage, a control valve in said auxiliary gas passage and an adjusting member subject to the influence of at least one factor in the working of the apparatus adapted to adjust said control valve.

10. A controller for gas-heated apparatus including a casing having a main gas passage and an auxiliary gas passage branching therefrom, a gas valve in the main gas passage and a gas regulator associated with said valve adapted to govern one condition in the gas flow through said main gas passage and subject to variations in pressure in said auxiliary gas passage, a valve member in the main gas passage serving also as control for the flow of gas into said auxiliary gas passage and an adjusting member for said valve member subject to the influence of at least one factor in the working of the apparatus.

11. A controller for gas-heated apparatus including a casing having a main gas passage and an auxiliary gas passage branching therefrom, a gas valve in the main gas passage and a gas regulator associated with said valve adapted to govern one condition in the gas flow through said main gas passage and subject to variations in pressure in said auxiliary gas passage, a valve member in the main gas passage serving also as control for the flow of gas into said auxiliary gas passage and an adjusting member for said valve member subject to the influence of at least one factor in the working of the apparatus, said valve member being in advance of said gas valve with regard to the direction of gas flow and said branch passage being located intermediate said valve member and said gas valve.

12. A controller for gas-heated apparatus including a casing having a main gas passage and an auxiliary gas passage branching therefrom, a gas valve in the main gas passage and a gas regulator associated with said valve adapted to govern one condition in the gas flow through said main gas passage and subject to variations in pressure in said auxiliary gas passage, a valve member in said main gas passage in advance of said gas valve, having a part serving as a shut-off valve and another part serving as a control for said auxiliary gas passage, said auxiliary gas passage branching from said main gas passage at a point between the portion of said valve member serving as a shut-off valve and the portion serving as a control for said auxiliary gas passage, and an adjusting member for said valve member subject to the influence of at least one factor in the working of the apparatus.

13. A controller for gas-heated apparatus including a casing having a main gas passage and an auxiliary gas passage branching therefrom, a gas valve in the main gas passage and a gas regulator associated with said valve adapted to govern one condition in the gas flow through said main gas passage and subject to variations in pressure in said auxiliary gas passage, a valve member in said main gas passage in advance of said gas valve, having a part serving as a shut-off valve and another part serving as a control for said auxiliary gas passage, said auxiliary gas passage branching from said main gas passage, at a point between the portion of said valve member serving as a shut-off valve and the portion serving as a control for said auxiliary gas passage, an adjusting member for said valve member subject to the influence of at least one factor in the working of the apparatus, and a further auxiliary valve arranged in the auxiliary gas passage adapted to act upon said gas regulator and subject to a control by said adjusting member.

14. A controller for gas-heated apparatus comprising a main gas passage, a gas valve therein, a gas control device including an actuating member subject to differences in gas pressure on opposite sides thereof, and a supplementary control device in said main gas passage subject to a factor in the working of the apparatus and adapted to produce differential gas pressures for application to opposite sides of said actuating member to cause closure of said gas valve under a given condition of said factor, said control devices cooperating in such a manner that alterations in the adjusting forces acting on the supplementary control device will cause an alteration in the loading on the other control device.

15. A controller for gas heated apparatus comprising a gas valve controlling a main gas passage, a gas pressure regulator including a diaphragm operated in accordance with gas pressure differences on opposite sides thereof associated with said valve and operable to regulate the pressure of the gas flowing through said valve, a governing device subject to one factor in the working of the apparatus, and an auxiliary gas valve in said main gas passage operable by said valve in said main gas passage operable by said governing device, said governing device cooperating with said auxiliary gas valve to produce differential gas pressures for application to opposite sides of said regulator to cause closure of said pressure regulating gas valve under a given condition of said factor.

16. A controller for gas-heated apparatus, comprising a gas valve controlling a main gas passage, a differential pressure operated regulator subject to variations of gas pressure on opposite sides thereof associated with said gas valve, a control device subject to the flow of a medium to be heated, and an auxiliary gas valve in said main gas passage operable by said control device, said control device cooperating with said auxiliary gas valve to produce differential gas pressures for application to opposite sides of said regulator to cause closure of said first mentioned gas valve on termination of the flow of said medium.

17. In a gas-heated apparatus, a gas burner, a main gas passage supplying gas to said burner, a gas valve in said main gas passage governing the flow to said burner, a pilot burner, means associated with said pilot burner and with said gas valve and adapted to close the gas valve when the flame of said pilot burner is extinguished, a control device subject to the flow of a medium to be heated, and an auxiliary gas valve in said main gas passage governing the flow of gas to said gas burner and operable by said control device, said control device cooperating with said auxiliary gas valve to cause closure of said first-mentioned gas valve, on termination of the flow of said medium.

18. A controller for gas-heated apparatus comprising a main gas passage, a gas valve therein, a gas control device including a diaphragm subject to differences in gas pressure on opposite sides thereof and adapted to control one condition in the gas flow, and a supplementary control device in said main gas-passage subject to one factor in the working of the apparatus and adapted to produce differential gas pressures for application to opposite sides of said diaphragm to cause closure of said gas valve under a given condition of said factor, said control devices cooperating in such a manner that alterations in the adjusting forces acting on the supplementary control device will cause an alteration in the loading on the other control device.

GEORG HEGWEIN.
OTTO MERTEN.
KURT FIEDLER.
FRIEDRICH WILHELM STOCKMEYER.